US010812764B2

(12) United States Patent
Senshiki

(10) Patent No.: US 10,812,764 B2
(45) Date of Patent: Oct. 20, 2020

(54) DISPLAY APPARATUS, DISPLAY SYSTEM, AND METHOD FOR CONTROLLING DISPLAY APPARATUS

(71) Applicant: SEIKO EPSON CORPORATION, Tokyo (JP)

(72) Inventor: Hiroki Senshiki, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/560,083

(22) Filed: Sep. 4, 2019

(65) Prior Publication Data

US 2020/0077059 A1 Mar. 5, 2020

(30) Foreign Application Priority Data

Sep. 5, 2018 (JP) ................. 2018-166138

(51) Int. Cl.
| | | |
|---|---|---|
| H04N 9/31 | (2006.01) | |
| G06T 7/70 | (2017.01) | |
| G06T 7/80 | (2017.01) | |
| G06T 7/90 | (2017.01) | |
| G01B 11/02 | (2006.01) | |

(52) U.S. Cl.
CPC ......... *H04N 9/3182* (2013.01); *G01B 11/026* (2013.01); *G06T 7/70* (2017.01); *G06T 7/80* (2017.01); *G06T 7/90* (2017.01); *H04N 9/3185* (2013.01)

(58) Field of Classification Search
CPC ...... H04N 9/3182; H04N 9/3185; G06T 7/70; G06T 7/80; G06T 7/90

USPC ......................................................... 348/745
See application file for complete search history.

(56) References Cited

U.S. PATENT DOCUMENTS

| | | | |
|---|---|---|---|
| 2005/0041217 A1* | 2/2005 | Tajima | G06T 3/00 |
| | | | 353/69 |
| 2014/0118705 A1* | 5/2014 | Hasegawa | H04N 9/3194 |
| | | | 353/85 |
| 2015/0208050 A1 | 7/2015 | Pawlak et al. | |
| 2016/0142691 A1* | 5/2016 | Kobiki | H04N 9/3194 |
| | | | 348/746 |
| 2016/0328089 A1* | 11/2016 | Nguyen | G06F 3/038 |
| 2017/0070635 A1* | 3/2017 | Takahashi | G06F 3/017 |

(Continued)

FOREIGN PATENT DOCUMENTS

| | | |
|---|---|---|
| JP | 2004-350154 A | 12/2004 |
| JP | 2014-131326 A | 7/2014 |
| JP | 2015-159524 A | 9/2015 |

(Continued)

*Primary Examiner* — Michael Lee
(74) *Attorney, Agent, or Firm* — Oliff PLC

(57) ABSTRACT

A display apparatus includes a display section that projects and displays an image on a display surface, an imaging section that captures an image of the display surface, a measurement section that measures the distance between the display surface and the display section, and a calibration processor that causes the display section to display a calibration image containing a position detection mark based on the distance measured by the measurement section, causes the imaging section to capture an image of the calibration image displayed on the display surface, and performs calibration that associates coordinates on the image with coordinates on the captured image captured by the imaging section based on the captured image.

9 Claims, 13 Drawing Sheets

(56) References Cited

U.S. PATENT DOCUMENTS

2017/0235425 A1* 8/2017 Chen .................... G06F 3/0418
　　　　　　　　　　　　　　　　　　　345/175

FOREIGN PATENT DOCUMENTS

| JP | 2015-166893 A | 9/2015 |
| JP | 2015-228144 A | 12/2015 |

* cited by examiner

DISPLAY APPARATUS, DISPLAY SYSTEM, AND METHOD FOR CONTROLLING DISPLAY APPARATUS

The present application is based on, and claims priority from JP Application Serial Number 2018-166138, filed Sep. 5, 2018, the disclosure of which is hereby incorporated by reference herein in its entirety.

BACKGROUND

1. Technical Field

The present disclosure relates to a display apparatus, a display system, and a method for controlling the display apparatus.

2. Related Art

There is a known display apparatus capable of projecting and displaying an image on a display surface, such as a screen, and accepting a pointing action of a pointing element in the state in which the image is displayed. A display apparatus of this type captures an image of the display surface and uses the captured image to detect a position on the display surface that is the position at which the pointing element is pointing. To increase the accuracy of the detection, it is typically necessary to perform calibration that associates a position on an image displayed on the display surface with a position on the captured image. The calibration includes projecting a calibration image containing marks for position detection on the display surface, capturing an image of the projected image, and using the captured image to perform the associating operation described above, as disclosed, for example, in JP-A-2015-159524 and JP-A-2015-166893. In the process of extracting the marks from the captured image, the calibration fails in some cases due, for example, to distortion of the shapes of the marks.

In the display apparatus described in JP-A-2015-166893, a plurality of types of calibration image different from one another are prepared, and one of the calibration images is used to perform the calibration. In a case where the calibration using the one calibration image fails, another calibration image is used to perform the calibration.

However, since the calibration condition is fixed irrespective of the state in which the display apparatus is installed, the calibration is undesirably likely to fail. A plurality of attempts of the calibration increases the period necessary for the calibration in accordance with the number of calibration failures.

SUMMARY

A display apparatus according to a preferable aspect of the present disclosure includes a display section that projects and displays an image on a display surface, an imaging section that captures an image of the display surface, a measurement section that measures a distance between the display surface and the display section, and a calibration processor that causes the display section to display a calibration image containing a position detection mark based on the distance measured by the measurement section, causes the imaging section to capture an image of the calibration image displayed on the display surface, and performs calibration that associates a position on the image with a position on a first captured image captured by the imaging section based on the first captured image.

A display system according to another preferable aspect of the present disclosure includes the display apparatus according to the aspect described above and a pointing element that points at a position on the display surface.

A display apparatus controlling method according to another preferable aspect of the present disclosure is a method for controlling a display apparatus including a display section that projects and displays an image on a display surface and an imaging section that captures an image of the display surface, the method including projecting a measurement image on the display surface, capturing an image of the display surface on which the measurement image has been displayed, measuring a distance between the display surface and the display section based on a result of the capture of an image of the measurement image, projecting a calibration image based on the measured distance, capturing an image of the display surface on which the calibration image has been projected, and performing calibration that associates a position on the image with a position on the captured image based on a result of the capture of an image of the calibration image.

DESCRIPTION OF EXEMPLARY EMBODIMENTS

Figure 1:
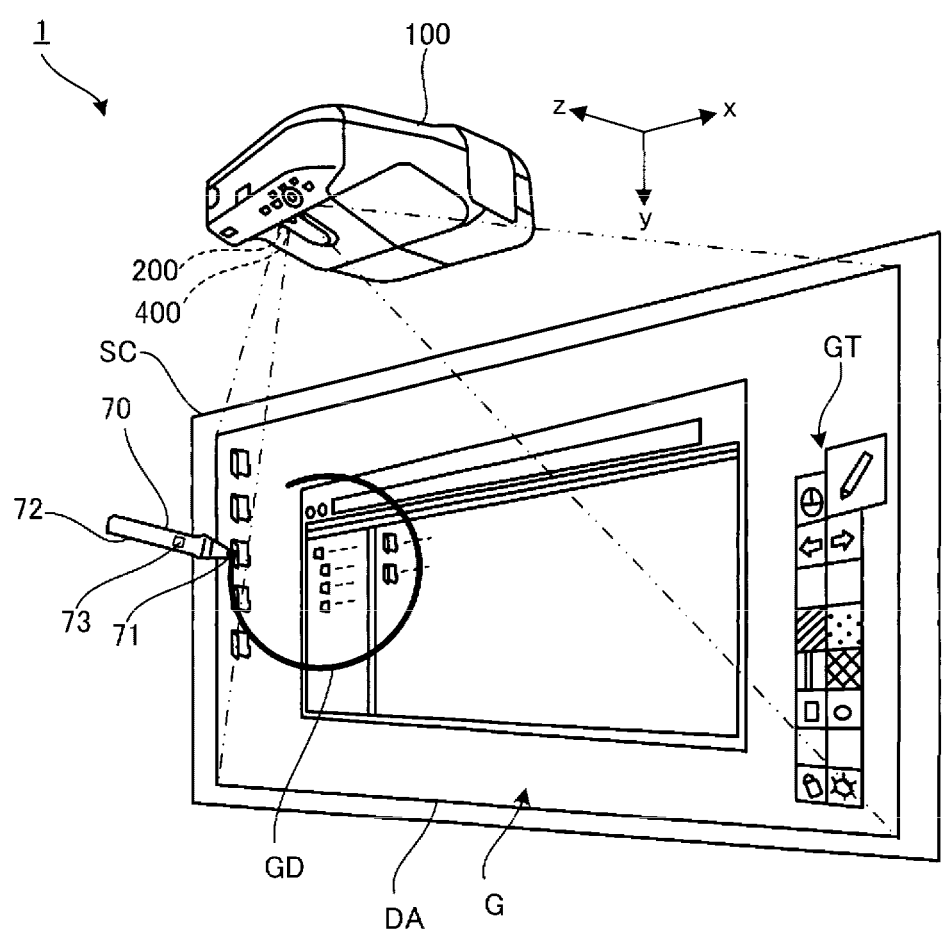
FIG. 1 is a perspective view showing a display system according to a first embodiment.

Preferable embodiments according to the present disclosure will be described below with reference to the accompanying drawings. The dimension and scale of each portion in the drawings differ from actual dimension and scale as appropriate, and some portions are diagrammatically shown for ease of understanding. The scope of the present disclosure is not limited to the embodiments unless the following description particularly states that restrictions are imposed on the present disclosure.

1. First Embodiment

1-1. Overview of Display System

FIG. 1 is a perspective view showing a display system 1 according to a first embodiment. The display system 1 includes a display apparatus 100 and a pointing element 70, as shown in FIG. 1. The display apparatus 100 is an interactive projector including a projection unit 200 and a position detection unit 400.

The display apparatus 100 projects image light on a screen SC, which is an example of the display surface, to display a projection image G on the screen SC. The screen SC shown in FIG. 1 is formed, for example, of a curtain or a wall surface. The screen SC has a planar shape in the example shown in FIG. 1 and may instead have a curved shape. In FIG. 1, the planar surface of the screen SC is a plane xy, and the direction of a normal to the screen SC is a direction z.

In the example shown in FIG. 1, the display apparatus 100 is disposed on the upper side of the vertical direction with respect to the screen SC along a normal to the screen SC. The display apparatus 100 therefore outputs the image light obliquely downward with respect to the vertical direction. The image light from the display apparatus 100 is projected in an image projection area DA, which is an area of the screen SC. The image projection area DA is a maximum range over which the display apparatus 100 can project the projection image G.

The display apparatus 100 can display, as the projection image G, an image on the screen SC based on image information from a personal computer that is not shown, as shown in FIG. 1. Further, the display apparatus 100 can detect a position on the screen SC that is the position at which the pointing element 70 is pointing and display a drawn image GD, which is the trajectory of the position, on the screen SC. The display apparatus 100 displays a tool bar GT, which is a GUI (graphical user interface) image that allows the display apparatus 100 to perform a variety of functions in response to a pointing action of the pointing element 70, on the screen SC.

The pointing element 70 is a pen-shaped, handheld device used by a user. The pointing element 70 includes a shaft 72, a tip button 71, which is disposed at the front end of the shaft 72, and a side button 73, which is disposed on the side surface of the shaft 72. The tip button 71 is a switch that is turned on when pressed against the screen SC. The side button 73 is a switch that the user presses with a finger.

Although not shown in FIT. 1, the pointing element 70 includes a light source that outputs light that belongs to the infrared region, as will be described later. The display apparatus 100 detects the light and detects, based on the result of the detection of the light, a position on the screen SC that is the position at which the pointing element 70 is pointing. In the following description, the "position on the screen SC that is the position at which the pointing element 70 is pointing" is also referred to as a "position at which the pointing element 70 is pointing."

1-2. Configuration of Pointing Element

Figure 2:
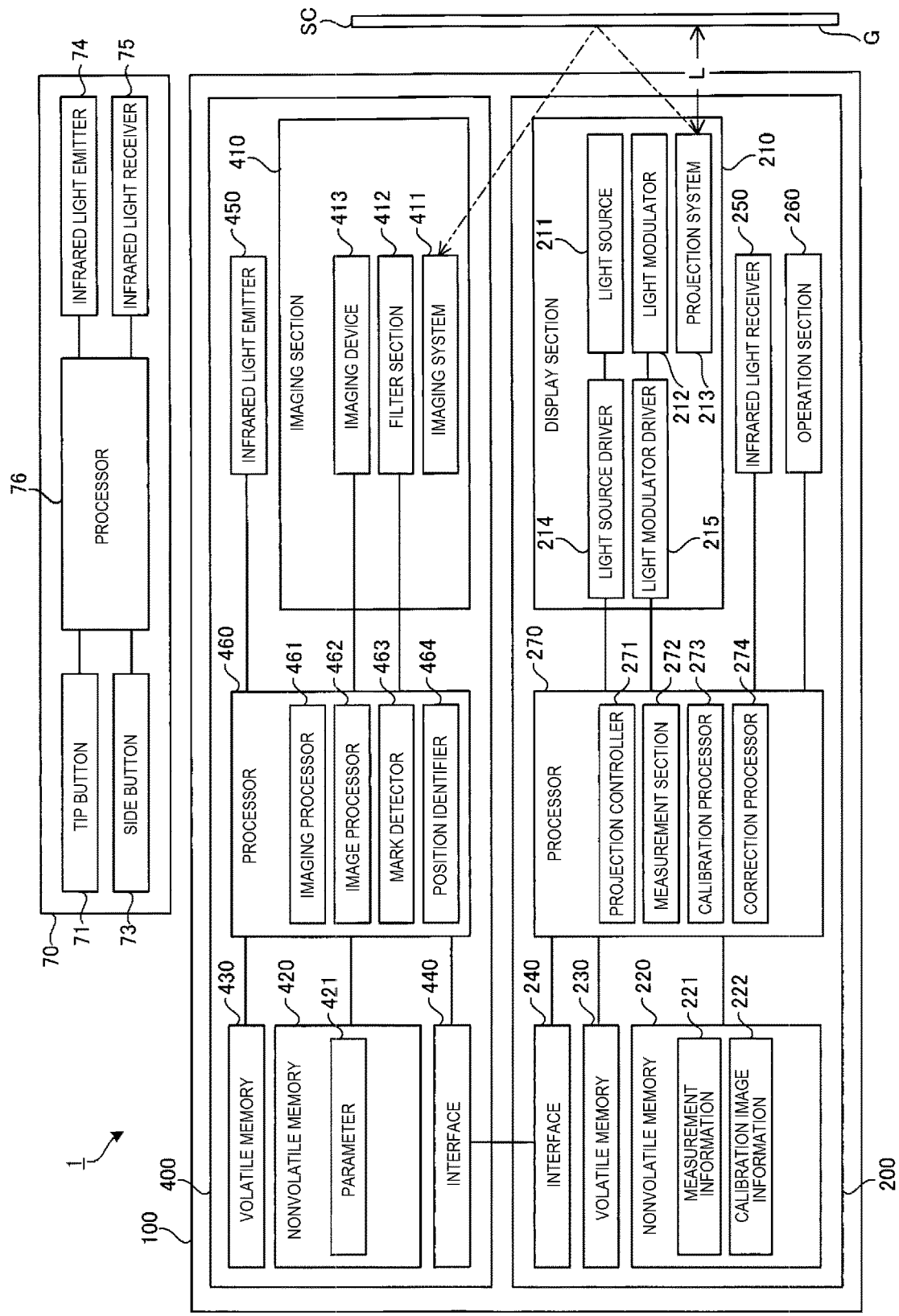
FIG. 2 is a block diagram showing a display apparatus and a pointing element that form the display system according to the first embodiment.

FIG. 2 is a block diagram showing the display apparatus 100 and the pointing element 70, which form the display system 1 according to the first embodiment. The pointing element 70 includes an infrared light emitter 74, an infrared light receiver 75 and, a controller 76 as well as the tip button 71, the shaft 72, and the side button 73, as shown in FIG. 2. The infrared light emitter 74 includes a light emitting device, for example, an LED (light emitting diode) that outputs light that belongs to the infrared region. The infrared light receiver 75 includes a light receiving device, for example, a photodiode that is sensitive to light that belongs to the infrared region. The controller 76 includes, for example, an IC (integrated circuit) that controls each of the portions of the pointing element 70.

In the thus configured pointing element 70, the infrared light receiver 75 receives an infrared sync signal transmitted by the position detection unit 400, which will be described later. The controller 76 controls and drives the infrared light emitter 74 based on a signal outputted from the infrared light receiver 75 to cause the infrared light emitter 74 to transmit an infrared signal that synchronizes with the infrared synch signal. The infrared light signal transmitted by the infrared light emitter 74 contains, for example, an identification code that identifies the pointing element 70 and distinguishes it from other pointing elements. The controller 76, when detecting operation performed on the tip button 71 or the side button 73, adds operation information on the detected operation to the infrared light signal to be transmitted by the infrared light emitter 74.

1-3. Configuration of Display Apparatus

The display apparatus 100 includes the projection unit 200, which projects the projection image G on the screen SC, and the position detection unit 400, which detects the position at which the pointing element 70 is pointing, as shown in FIG. 2. In the present embodiment, the projection unit 200 and the position detection unit 400 are accommodated in a single enclosure and may instead be accommodated in separate enclosures. The following description will be made with reference to a case where the projection unit 200 and the position detection unit 400 are communicably coupled via a wire to each other, and the two components may instead be communicably and wirelessly coupled to each other.

The projection unit 200 projects image light based on image information from an external apparatus used as an image source and displays the image light on the screen SC.

Although not shown, the projection unit 200 includes an interface that can be coupled to the external apparatus. Examples of the external apparatus may include a DVD (digital versatile disk) player and a personal computer. The projection unit 200 can also project image light based on image information stored in a nonvolatile memory 220, which will be described alter, on the screen SC.

The projection unit 200 includes a display section 210, the nonvolatile memory 220, a volatile memory 230, an interface 240, an infrared light receiver 250, operation section 260, and a processor 270. These portions are communicably coupled to each other. The portions of the projection unit 200 will be sequentially described below.

The display section 210 projects an image on the screen SC to display the projection image G. The display section 210 includes a light source 211, a light modulator 212, a projection system 213, a light source driver 214, and a light modulator driver 215.

The light source 211 is formed, for example, of a halogen lamp, a xenon lamp, an ultrahigh-pressure mercury lamp, an LED (light emitting diode), or a laser light source. The light modulator 212 modulates light outputted from the light source 211 to generate the image light. The light modulator 262 is formed, for example, of a light modulation device, such as a transmissive liquid crystal panel, a reflective liquid crystal panel, and a digital mirror device (DMD). The projection system 213 focuses the image light from the light modulator 212 into an image on the screen SC. The projection system 213 is an optical system including at least one projection lens and may include a zoom lens, a focus lens, or any other lens. The light source driver 214 includes a drive circuit that drives the light source 211. The light modulator driver 215 includes a drive circuit that drives the light modulator 212.

The nonvolatile memory 220 is formed, for example, of a magnetic storage device or a flash ROM (read only memory). The nonvolatile memory 220 stores measurement information 221 and calibration image information 222. The measurement information 221 contains information on a distance L measured by a measurement section 272, which will be described later. The calibration image information 222 contains image information on a calibration image GC used by a calibration processor 273, which will be described later. The nonvolatile memory 220 also stores a program executed by the processor 270 and other pieces of information.

The volatile memory 230 temporarily stores data used in processes carried out by the processor 270, the program executed by the processor 270, and other pieces of information. For example, the volatile memory 230 functions as a frame buffer where the processor 270 develops each frame of image information.

The interface 240 is an interface that couples the processor 270 to the position detection unit 400. The interface 240 is a general-purpose interface, such as a USB (universal serial bus) interface.

The infrared light receiver 250 includes, for example, a light receiving device, as does the infrared light receiver 75 of the pointing element 70 described above, and receives the infrared signal from the pointing element 70 described above. The infrared light receiver 250 decodes the infrared signal and outputs a signal based on the infrared signal.

The operation section 260 includes, for example, although not shown, an operation panel disposed on an enclosure of the display apparatus 100. The operation section 260 outputs a signal based on the user's operation performed on the operation panel. The operation section 260 may receive an infrared signal transmitted from a remote control that is not shown but is capable of accepting the user's operation, decode the infrared signal, and output a signal according to the operation performed on the remote control.

The processor 270 is a computation processing device formed, for example, of a CPU (central processing unit) and has the function of controlling each of the portions of the projection unit 200 and the function of processing a variety of data including the image information. The processor 270 in the present embodiment executes a control program stored in the nonvolatile memory 220 to achieve a variety of functions including functional portions described later. The processor 270 may be formed of a single processor or a plurality of processors. The processor 270 may instead be formed of hardware that implements the variety of functions including functional portions described later.

The processor 270 includes, as the functional portions, a projection controller 271, the measurement section 272, the calibration processor 273, and a correction processor 274.

The projection controller 271 controls the display section 210, more specifically, the light source driver 212 and the light modulator driver 23 to cause them to display an image based on the image information on the screen SC.

The measurement section 272 measures the distance L between the display section 210 and the screen SC. More specifically, the measurement section 272 causes the display section 210 to display a measurement image GM containing measurement marks. The measurement section 272 causes an imaging section 410, which will be described later, to capture an image of the measurement image GM projected on the screen SC and measures the distance L based on a captured image GI captured by the imaging section 410. The distance L is information corresponding to the projection distance of the display apparatus 100 and is a value corresponding to the distance between a reference position in the display section 210 and the screen SC or a plane that is an extension thereof. The reference position is, for example, as shown in FIG. 2, a position located on the optical axis of the projection system 213 of the display section 210 and representing an end of the projection system 213 that is the end facing the screen SC. The distance L is preferably a distance in the direction along the optical axis of the projection system 213 but may instead be a distance in the direction along a normal to the screen SC. The captured image GI generated by the imaging section 410 that captures an image of the screen SC on which the measurement image GM is projected is an example of a second captured image.

Before the calibration is performed, the calibration processor 273 adjusts luminance Lm of the light from the light source 211 in accordance with the distance L measured by the measurement section 272. In the present embodiment, the calibration processor 273 monotonously lowers the luminance Lm of the light from the light source 211 as the distance L measured by the measurement section 272 decreases.

The calibration processor 273 causes the display section 210 to display the calibration image GC containing position detection marks as the projection image G, causes the imaging section 410, which will be described later, to capture an image of the calibration image GC displayed on the screen SC, and performs calibration that associates the position on the projection image G with the position on the captured image GI captured by the imaging section 410 based on the captured image GI. That is, the calibration processor 273 associates the coordinate system on which the projection image G is based with the coordinate system on which the captured image GI is based. The calibration processor 273 performs the calibration based on the distance L measured by the measurement section 272. In the present embodiment, the calibration processor 273 adjusts the luminance Lm of the light from the light source 211 of the display section 210 before the calibration is performed based on the distance L measured by the measurement section 272. At this point, the calibration processor 273 uses the calibration image information 222 stored in the nonvolatile memory 220 described above to generate the calibration image. The captured image GI generated by the imaging section 410 that captures an image of the screen SC on which the calibration image GC is projected is an example of a first captured image.

The correction processor 274 corrects the geometrical shape of the projection image G displayed on the screen SC. The geometrical correction is, for example, trapezoidal distortion correction or barrel distortion correction.

The portions of the projection unit 200 have been described. The position detection unit 400 is communicably coupled to the interface 240 provided in the projection unit 200 described above. The position detection unit 400 has the function of detecting the position at which the pointing element 70 is pointing and the function of detecting marks or any other object in the calibration image displayed on the screen SC during the calibration.

The position detection unit 400 includes the imaging section 410, a nonvolatile memory 420, a volatile memory 430, an interface 440, an infrared light emitter 450, and a processor 460. These portions are communicably coupled to each other. The portions of the position detection unit 400 will be sequentially described below.

The imaging section 410 captures an image of the screen SC. The imaging section includes an imaging system 411, a filter section 412, and an imaging device 413.

The imaging system 411 is an optical system including at least one imaging lens and may include a variety of optical elements, such as a prism, or may include a zoom lens, a focus lens, and other lenses. The imaging system 411 preferably includes a wide-angle lens or a fish-eye lens because each of the lenses allows the imaging device 413 to readily capture an image of a wide range containing the entire image projection area DA.

The filter section 412 includes, although not shown, a visible light transmitting filter and an infrared light transmitting filter. The filters are so configured that a state in which the filters are placed in the optical path between the imaging system 411 and the imaging device 413 is switchable to a state in which the filters are retracted from the optical path and vice versa. To capture a visible light image projected by the display section 210 with the imaging device 413, the visible light transmitting filter is placed in the optical path with the infrared light transmitting filter retracted from the optical path. To capture the infrared light issued by the pointing element 70 with the imaging device 413, the infrared light transmitting filter is placed in the optical path with the visible light transmitting filter retracted from the optical path.

The imaging device 413 is formed, for example, of a CCD (charge coupled device) image sensor or a CMOS (complementary MOS) image sensor. The imaging device 413 performs the imaging via the imaging system 411 and the filter section 412 and outputs captured image information containing the captured image GI.

The nonvolatile memory 420 is formed, for example, of a magnetic storage device or a flash ROM. The nonvolatile memory 420 stores parameters 421 used in processes carried out by the processor 460.

The parameters 421 include a variety of parameters usable in processes carried out by an image processor 462, a mark detector 463, and a position identifier 464, which are functional portions of the processor 460 and will be described later.

The volatile memory 430 temporarily stores data used in the processes carried out by the processor 460, a program executed by the processor 460, and other pieces of information. For example, the volatile memory 430 functions as a buffer that temporarily stores the captured image information from the imaging section 410.

The interface 440 is an interface coupled to the interface 240 of the projection unit 200 described above. The connection allows the processor 460 to be communicably connected to the projection unit 200. The interface 440 is an interface that complies with the same standard as that of the interface 240 of the projection unit 200 described above, for example, a general-purpose interface, such as a USB interface.

The infrared light emitter 450 includes a light emitting device, as does the infrared light emitter 74 of the pointing element 70 described above, and transmits an infrared sync signal for synchronizing the position detection unit 400 with the pointing element 70.

The processor 460 is a computation processing device formed, for example, of a CPU and has the function of controlling each of the portions of the position detection unit 400 and the function of processing a variety of data including the captured image information. The processor 460 in the present embodiment executes a control program stored in the nonvolatile memory 420 to achieve a variety of functions including functional portions described later. The processor 460 may be formed of a single processor or a plurality of processors. The processor 460 may instead be formed of hardware that implements the variety of functions including functional portions described later.

The processor 460 includes, as the functional portions, an imaging processor 461, the image processor 462, the mark detector 463, and the position identifier 464.

The imaging processor 461 controls the imaging section 410, more specifically, the filter section 412 and the imaging device 413 to cause them to capture an image of an area containing the image projection area DA of the screen SC and acquires the captured image information containing the captured image GI. The imaging processor 461 switches the visible light transmitting filter and the infrared light transmitting filter of the filter section 412 from one to the other, adjusts the imaging timing, shutter speed, and exposure of the imaging device 413, and other types of operation, as required.

The image processor 462 performs image processing on the captured image information acquired by the imaging processor 461, such as brightness adjustment, contrast adjustment, and color subtraction. The image processing uses the parameters 421 stored in the nonvolatile memory 420 described above as appropriate.

When the calibration processor 273 described above causes the display section 210 to display the calibration image GC, the mark detector 463 carries out the process of detecting the positions of the marks in the calibration image GC based on the captured image information processed by the image processor 462. Also when the measurement section 272 described above causes the display section 210 to display the measurement image GM, the mark detector 463 carries out the process of detecting the positions of the marks in the calibration image GM based on the captured image information processed by the image processor 462. The process carried out by the mark detector 463 uses the parameters 421 stored in the nonvolatile memory 420 described above as appropriate.

The position identifier 464 detects the position where the pointing element 70 emits light based on the captured image information processed by the image processor 462 and carries out the process of identifying the position at which the pointing element 70 is pointing. The process uses the parameters 421 stored in the nonvolatile memory 420 described above as appropriate.

The portions of the position detection unit 400 have been described. The position detection unit 400 detects the position at which the pointing element 70 is pointing, as described above. To increase the accuracy of the detection, it is necessary to perform the calibration that associates the position on the projection image G displayed on the screen SC with the position on the captured image GI captured by the imaging section 410 described above. The calibration will be described below.

1-4. Action of Display Apparatus
1-4a. Overview of Calibration

The display apparatus 100 first measures the distance L between the screen SC and the display section 210. The display apparatus 100 then displays the calibration image GC on the screen SC based on the distance L and captures an image of the calibration image GC on the screen SC. The display apparatus 100 then detects the marks in the calibration image GC based on the captured image GI and associates a position on the projection image G with a position on the captured image GI. The display apparatus 100 produces calibration information on the association operation. The calibration information is used in the process carried out by the position identifier 464 of the position detection unit 400, that is, the process of detecting the position at which the pointing element 70 is pointing.

Figure 3:
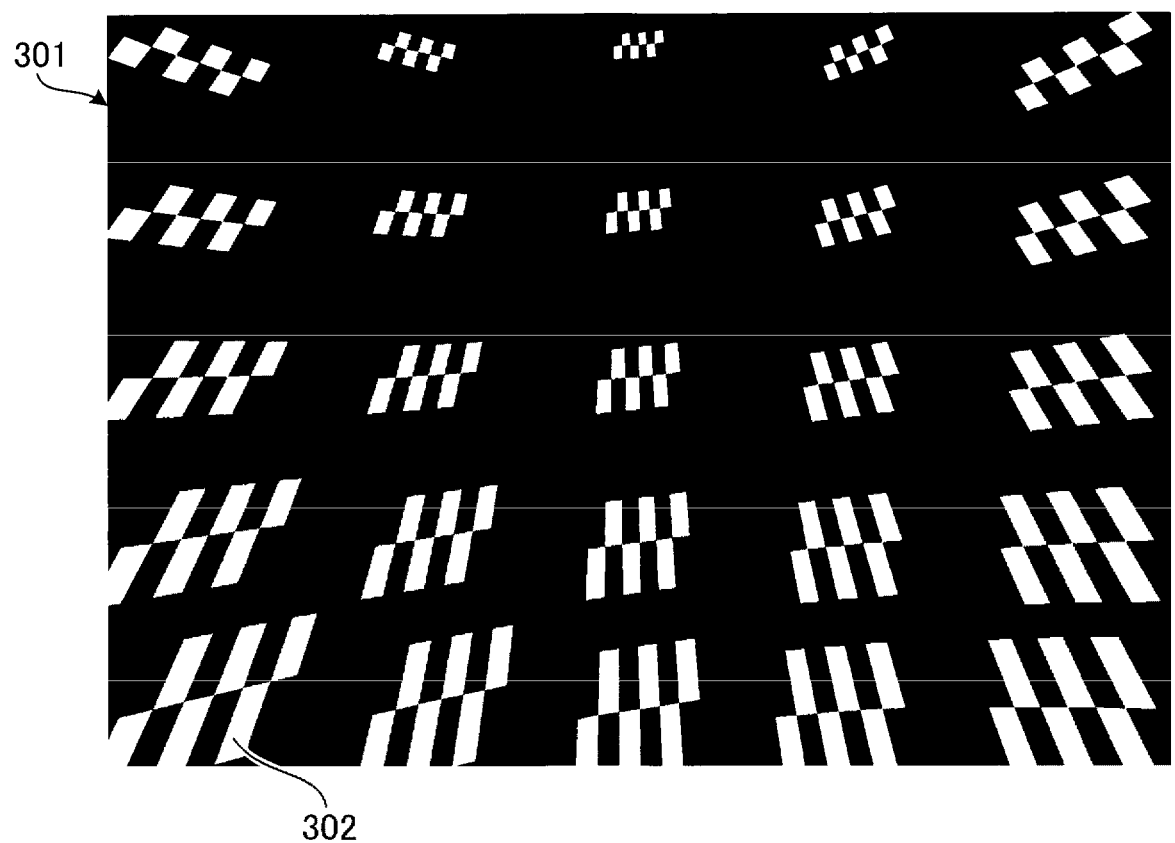
FIG. 3 shows an example of a calibration image on a display surface.

FIG. 3 shows an example of the calibration image GC. A calibration image 301, which is an example of the calibration image GC displayed on the screen SC, contains a plurality of marks 302 for position detection. In the example shown in FIG. 3, the marks 302 are disposed in a matrix having five rows and five columns. The calibration image 301 has a rectangular outer shape in correspondence with a display area of the light modulator 212 of the display section 210. The plurality of marks 302 are so distributed as to be also disposed in end portions and corner portions of the calibration image 301. The outer shape of the calibration image 301, the number of marks 302, and the arrangement of the marks 302 are not limited to those in the example shown in FIG. 3 but are preferably so set that the marks 302 are readily detected.

The marks 302 differ by at least a predetermined value in luminance or grayscale from a background that is the area of the calibration image 301 excluding the marks 302 so that the mark detector 463 readily detects the outer edge of each of the marks 302. In the example shown in FIG. 3, the marks 302 have a bright color, such as white, and the background has a dark color, such as black. The colors of the background and the marks 302 only need to be so set that the mark detector 463 can detect the boundaries between the marks 302 and the background and are not limited to those in the example shown in FIG. 3. For example, the marks 302 may have a dark color, and the background may have a bright color.

Figure 4:
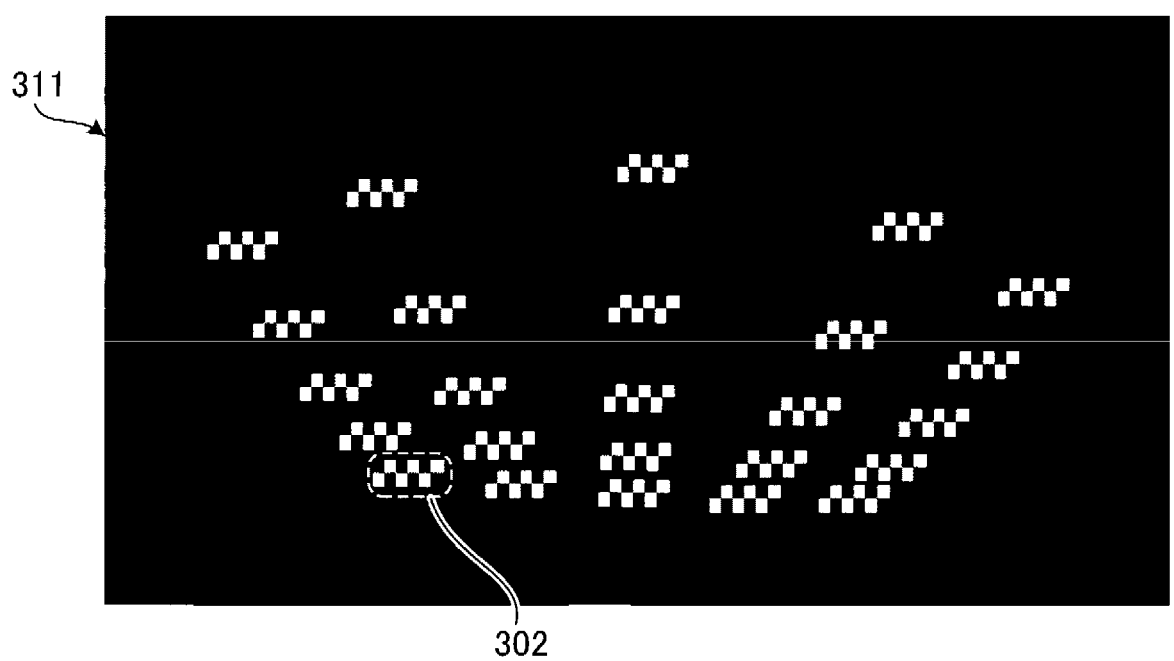
FIG. 4 shows an example of a captured image generated by capturing an image of the display surface on which the calibration image is displayed.

FIG. 4 shows an example of the captured image GI. A captured image 311 is the captured image GI generated by the imaging section 410 that captures an image of the screen SC on which the calibration image 301 is displayed. The plurality of marks 302 in the captured image 311 have distorted shapes and arrangement resulting from the characteristics, arrangement, and other factors of the imaging system 411. The outer edges of the marks 302 include a plurality of line segments perpendicular to each other, and when captured image information containing the plurality of line segments is obtained, the mark detector 463 can readily detect the intersections of the plurality of line segments, whereby the mark detector 463 can detect the positions of the marks 302 with increased accuracy.

1-4b. Procedure of Calibration

Figure 5:
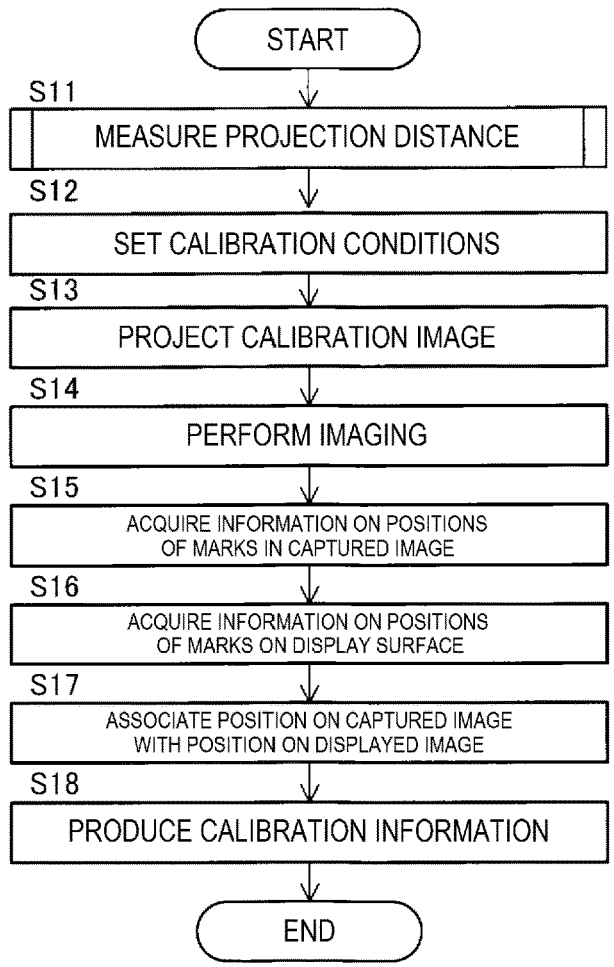
FIG. 5 is a flowchart showing a calibration process carried out by the display apparatus according to the first embodiment.

FIG. 5 is a flowchart showing a calibration process carried out by the display apparatus 100 according to the first embodiment. When the processor 270 receives a calibration start instruction, the measurement section 272 of the display apparatus 100 first measures the distance L between the screen SC and the display section 210 in step S11. Examples of the calibration start instruction may include an instruction resulting from operation performed on the operation section 260 and an instruction based on the control program. The process in step S11 will be described later in detail.

The processor 270 then causes the nonvolatile memory 220 to store the measurement information 221 on the distance L measured by the measurement section 272 to set calibration conditions in step S12.

In step S13, the calibration processor 273 instructs the projection controller 271 to cause the display section 210 to display the calibration image 301 based on the calibration image information 222. At this point, the calibration processor 273 adjusts the luminance Lm of the light from the light source 211 of the display section 210 based on the distance L measured by the measurement section 272. Specifically, the adjustment is so made that the luminance Lm of the light from the light source 211 decreases as the distance L decreases. The adjustment can reduce variation in brightness of the calibration image 301 on the screen SC even when the distance L changes.

Thereafter, in step S14, the calibration processor 273 instructs the imaging processor 461 to cause the imaging section 410 to capture an image of the image projection area DA, where the calibration image 301 is projected. At this point, the processor 460 causes the volatile memory 430 to temporarily store the captured image information on the captured image 311 generated by the imaging processor 461.

In step S15, the mark detector 463 detects the positions of the marks 302 in the captured image 311 based on the captured image information, and the calibration processor 273 acquires information on the positions. At this point, the mark detector 463 detects the boundaries between the marks 302 and the background in the captured image 311 and uses the intersections of the line segments along the boundaries to determine the positions of the marks 302 in the captured image 311. In the present embodiment, a plurality of intersections are obtained for each of the marks 302, and one of the intersections that serves as a reference is determined as the position of the mark 302 in the captured image 311. The positions of the marks 302 in the captured image 311 are expressed, for example, by the coordinates in the coordinate system set in the captured image 311. In step S15, the image processor 462 may perform color subtraction and other types of processing on the captured image information before the process carried out by the mark detector 463.

In step S16, the calibration processor 273 acquires information on the positions of the marks 302 in the calibration image 301 displayed on the screen SC. The information is obtained, for example, from the calibration image information 222 developed in the volatile memory 230, which functions as a frame buffer. The positions of the marks 302 in the calibration image 301 displayed on the screen SC are expressed, for example, by the coordinates in a coordinate system set on the screen SC or in the display section 210.

Thereafter, in step S17, the calibration processor 273 associates a position in the calibration image 301 with a position in the captured image 311 based on the information acquired in steps S15 and S16 described above. That is, the coordinate system on which the captured image 311 is based is associated with the coordinate system set on the screen SC or in the display section 210.

Thereafter, in step S18, the calibration processor 273 causes the nonvolatile memory 220 to store calibration information on the association operation in step S17. The calibration information is used in the process carried out by the position identifier 464 of the position detection unit 400, as described above. The position identifier 464 can use the calibration information to determine the position on the image projected by the position detection unit 400 that corresponds to an arbitrary position on the image captured by the imaging section 410. The position in an image projected in a position at which the pointing element 70 is pointing can thus be identified, whereby operation performed by using the pointing element 70 on a GUI (graphical user interface) can be detected or otherwise known.

1-4c. Procedure of Distance Measurement

Figure 6:
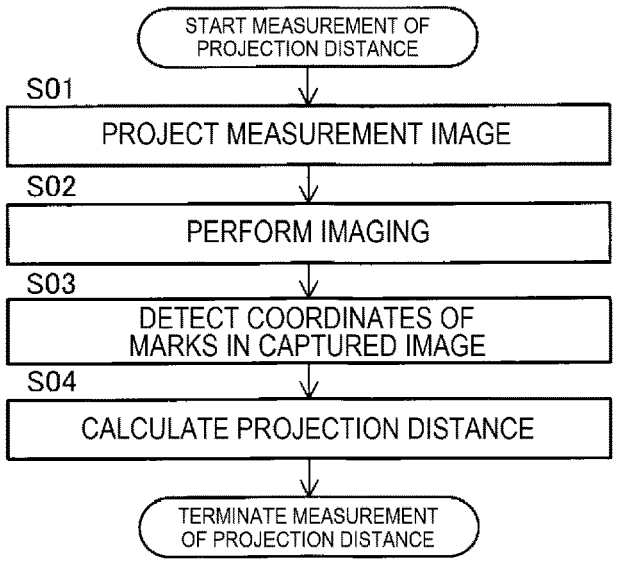
FIG. 6 is a flowchart showing a distance measurement process carried out by the display apparatus.

FIG. 6 is a flowchart showing the process in step S11 described above, that is, a distance measurement process carried out by the display apparatus 100. In the distance measurement process, the measurement section 272 first causes the display section 210 to display the measurement image GM containing the measurement marks in step S01.

Thereafter, in step S02, the measurement section 272 causes the imaging section 410 to capture an image of the image projection area DA, where the measurement image GM is projected. The measurement section 272 causes the volatile memory 430 to temporarily store the captured image information produced by the imaging processor 461.

In step S03, the mark detector 463 detects the positions of the marks in the captured image GI based on the captured image information and the measurement section 272 acquires information on the positions. In step S03, the image processor 462 may perform color subtraction and other types of processing on the captured image information before the process carried out by the mark detector 463.

The measurement section 272 then calculates the distance L in step S04.

Figure 7:
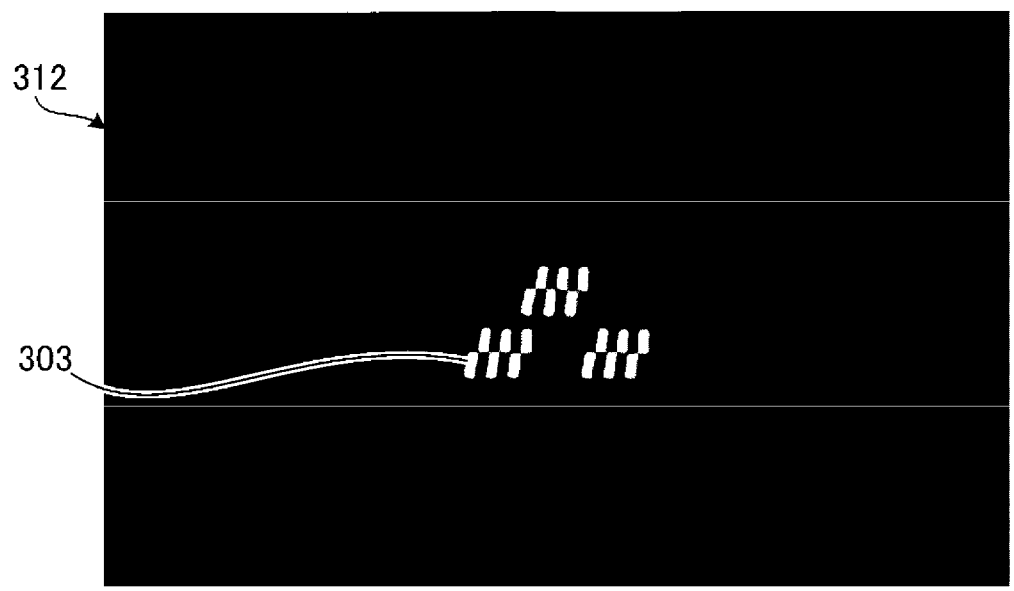
FIG. 7 shows an example of a measurement image displayed on the display surface.

FIG. 7 shows an example of the measurement image GM. A measurement image 312, which is an example of the measurement image GM, is displayed on the screen SC in step S01 described above. The measurement image 312 contains marks 303, which are each the same as each of the marks 302 contained in the calibration image 301 described above. In the example shown in FIG. 7, the number of marks 303 contained in the measurement image 312 is three. Although not shown, information on the distance between the marks 303 in a predetermined distance L is stored in advance in the nonvolatile memory 220. Therefore, in step S04, the measurement section 272 can measure the distance L by using the information on the distance between the marks 303 and the information obtained in step S03 described above to calculate the distance L based on triangulation.

In the present embodiment, the calibration processor 273 adjusts the luminance Lm of the light from the light source 211 of the display section 210 based on the distance L measured by the measurement section 272. The adjustment can reduce variation in brightness of the calibration image on the screen SC even when the distance L changes. As a result, even when the distance L changes, the brightness of the calibration image 301 on the screen SC can be appropriate brightness, whereby accurate position detection can be performed.

Figure 8:
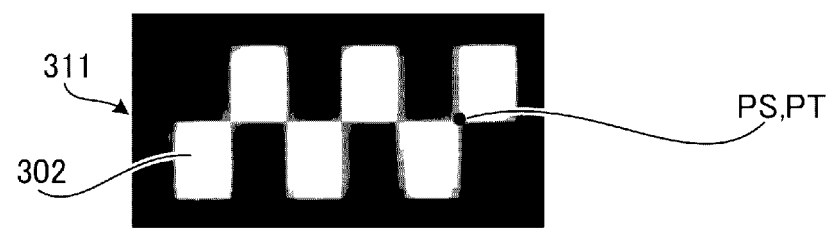
FIG. 8 shows the state of a mark in a captured image when the calibration image on the display surface has appropriate brightness.

FIG. 8 shows the state of one of the marks 302 in the captured image 311 when the calibration image 301 on the screen SC has appropriate brightness. In this case, a position PS of the mark 302 detected by the mark detector 463 coincides with a position PT that should be detected. The adjustment of the luminance Lm of the light from the light source 211 therefore allows an increase in the accuracy of the detection of the marks 302 in the calibration image 301.

In contrast, when the luminance Lm of the light from the light source 211 is fixed, the brightness of the calibration image 301 displayed on the screen SC increases as the distance L decreases, whereas the brightness decreases as the distance L increases.

Figure 9:
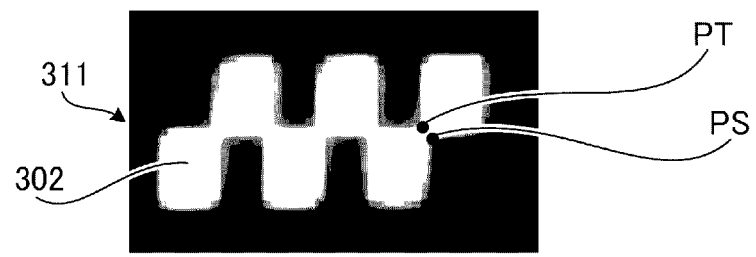
FIG. 9 shows the state of the mark in the captured image when the calibration image on the display surface has too high brightness.

FIG. 9 shows the state of one of the marks 302 in the captured image 311 when the calibration image 301 on the screen SC has too high brightness. In the case where the calibration image 301 displayed on the screen SC has too high brightness, the position PS of each of the marks 302 detected by the mark detector 463 undesirably deviates from the position PT that should be detected, as shown in FIG. 9. The deviation results in a decrease in the accuracy of the detection of the marks 302 in the calibration image 301. The reason for this is that the sensitivity of the pixels of the imaging device 413 provided in the imaging section 410 is saturated in the pixels corresponding to the boundary between the bright and dark portions of the calibration image 301. On the other hand, when the calibration image 301 displayed on the screen SC has too low brightness, the difference in brightness between the bright and dark portions of the calibration image 301, that is, the contrast of the calibration image 301 decreases. Also in this case, the decrease in contrast results in a decrease in the accuracy of the detection of the marks 302 in the calibration image 301.

Figure 10:
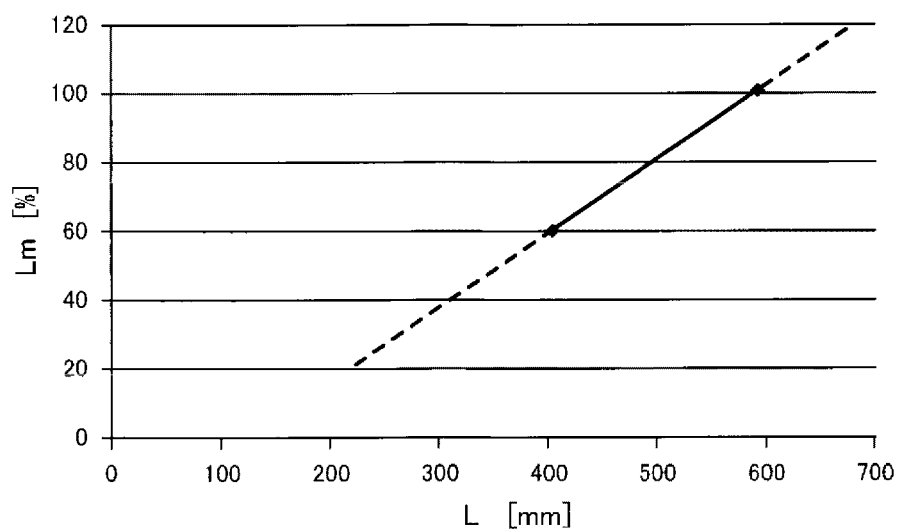
FIG. 10 shows an example of the relationship between a measured distance and the luminance of the light from a light source of a display section.

FIG. 10 shows an example of the relationship between the distance L measured by the measurement section 272 and the luminance Lm of the light from the light source 211 of the display section 210. The calibration processor 273 monotonously lowers the luminance Lm of the light from the light source 211 of the display section 210 as the distance L measured by the measurement section 272 decreases, as shown in FIG. 10. The brightness of the calibration image 301 on the screen SC can thus be appropriate in accordance with a change in the distance L. The change in the luminance Lm with a change in the distance L is a continuous, linear change in the example shown in FIG. 10, and the luminance Lm of the light from the light source 211 is monotonously lowered. In some cases, however, the change in the luminance Lm with a change in the distance L is a stepwise or nonlinear change. In such cases the luminance Lm of the light from the light source 211 may be adjusted accordingly.

The display apparatus 100 described above includes the display section 210, the imaging section 410, the measurement section 272, and the calibration processor 273, as described above. The display section 210 projects and displays the projection image G on the screen SC, which is the display surface. The imaging section 410 captures an image of the screen SC. The measurement section 272 measures the distance L between the screen SC and the display section 210. The calibration processor 273 performs the calibration based on the distance L measured by the measurement section 272. More specifically, the calibration processor 273 causes the display section 210 to display the calibration image 301 containing the position detection marks 302 based on the distance L. In this state, the calibration processor 273 causes the imaging section 410 to capture an image of the calibration image 301 displayed on the screen SC. The calibration processor 273 then associates a position on the projection image G displayed on the screen SC with a position on the captured image 311 captured by the imaging section 410 based on the captured image 311, which is the first captured image captured by the imaging section 410.

As described above, in the display apparatus 100, the calibration processor 273 uses the distance L measured by the measurement section 272 to perform the calibration. A decrease in the accuracy of the detection of the marks 302 in the calibration image 301 due to a change in the distance L can thus be reduced. As a result, even when the installation state of the display apparatus is changed, the success rate or accuracy of the calibration can be increased.

The display section 210 includes the light source 211 used to project the projection image G. In the present embodiment, the calibration processor 273 monotonously lowers the luminance Lm of the light from the light source 211 as the distance L measured by the measurement section 272 decreases. Variation in the brightness of the calibration image 301 displayed on the screen SC due to a change in the distance L can thus be reduced. As a result, even when the distance L is changed, a decrease in the accuracy of the detection of the marks 302 in the calibration image 301 can be reduced.

The measurement section 272 in the present embodiment causes the display section 210 to display the measurement image 312 containing the measurement marks 303, causes the imaging section 410 to capture an image of the measurement image 312 displayed by the display section 210, and measures the distance L between the screen SC and the display section 210 based on the second captured image captured by the imaging section 410. The above-mentioned measurement of the distance L by using the display section 210 and the imaging section 410 allows measurement of the distance L with no separately provided distance meter. The configuration of the display apparatus 100 can therefore be simplified, whereby the cost of the display apparatus 100 can be lowered.

The method for controlling the display apparatus 100 includes step S01 of projecting the measurement image 312 on the screen SC, step S02 of capturing an image of the screen SC on which the measurement image 312 has been displayed, steps S03 and S04 of measuring the distance L between the screen SC and the display section 210 based on the result of the image capturing of the measurement image 312, steps S12 and S13 of projecting the calibration image 301 based on the measured distance L, step S14 of capturing an image of the screen SC on which the calibration image 301 has been projected, and steps S15 to S18 of performing the calibration that associates a position on the projection image G with a position on the captured image based on the result of the image capturing of the calibration image 301.

2. Second Embodiment

A second embodiment will next be described. The present embodiment is the same as the first embodiment described above except that the result of the measurement performed by the measurement section 272 is used to generate the calibration image. In the following description, the second embodiment will be described primarily on the difference from the first embodiment described above, and the same items will not be described. In the figures used to describe the second embodiment, the same configurations as those in the first embodiment described above has the same reference characters.

2-1. Configurations of Display System and Display Apparatus

Figure 11:
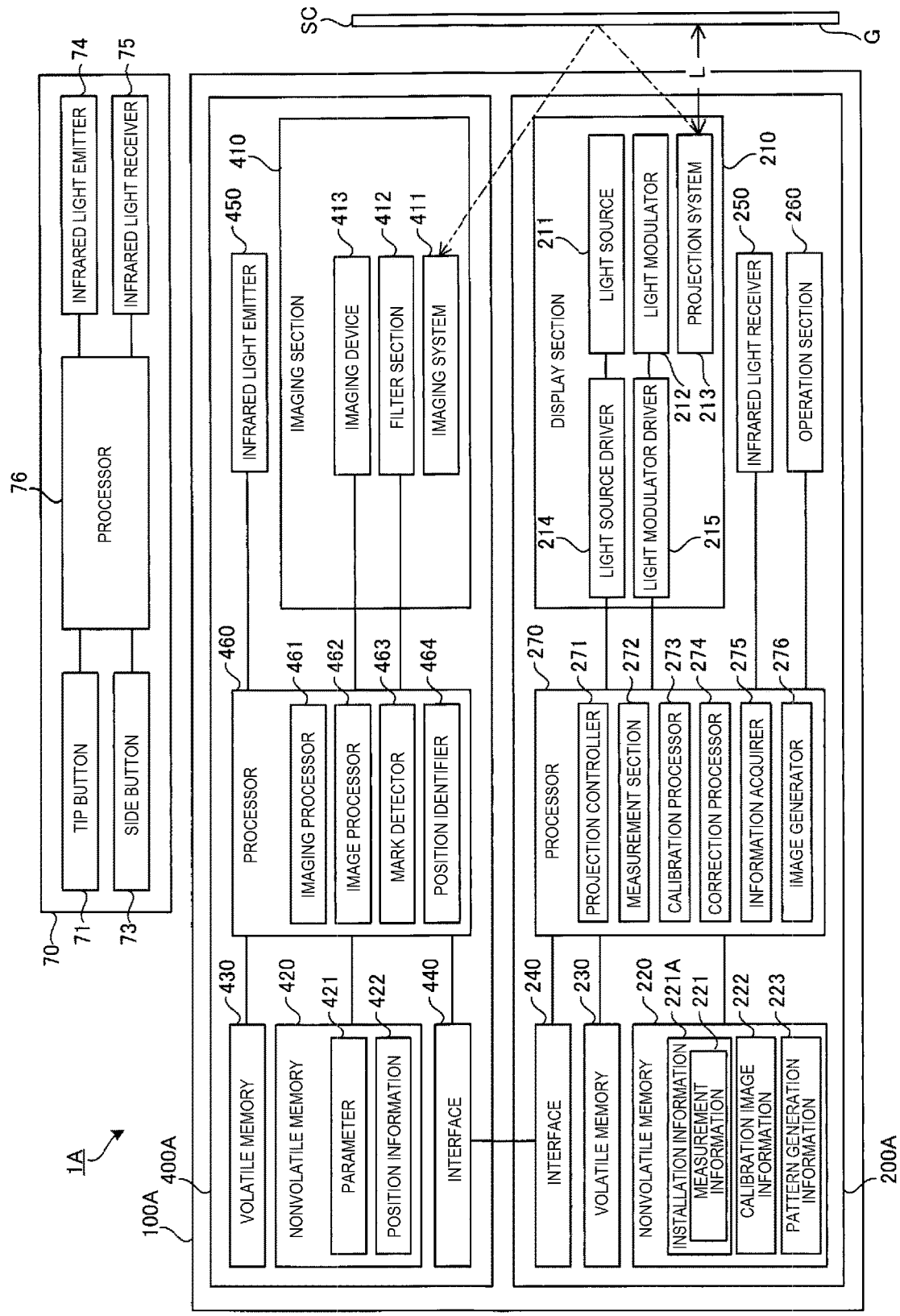
FIG. 11 is a block diagram showing a display apparatus and a pointing element that form a display system according to a second embodiment.

FIG. 11 is a block diagram showing a display apparatus 100A and the pointing element 70, which forma display system 1A according to the second embodiment. The display system 1A includes the display apparatus 100A and the pointing element 70. The display apparatus 100A includes a projection unit 200A and a position detection unit 400A.

The projection unit 200A has the same hardware configuration as that of the projection unit 200 in the first embodiment. It is, however, noted that the nonvolatile memory 220 stores installation information 221A and pattern generation information 223 as well as the same measurement information 221 and calibration image information 222 as those in the first embodiment. The installation information 221A contains the measurement information 221. The nonvolatile memory 220 further stores a control program different from that in the first embodiment. The processor 270 reads and executes the control program to achieve a variety of functions including functional portions described later.

The processor 270 in the present embodiment includes, as the functional portions, an information acquirer 275 and an image generator 276 as well as the same projection controller 271, measurement section 272, calibration processor 273, and correction processor 274 as those in the first embodiment.

The information acquirer 275 acquires information on the installation state of the display apparatus 100A and causes the nonvolatile memory 220 to store the information as the installation information 221A. More specifically, the information acquirer 275 acquires, as the information, the measurement information 221 from the nonvolatile memory 220. The information acquirer 275 further acquires position information 422, which will be described later, and other pieces of information as the information from the position detection unit 400A via the interface 240. The source from which the information acquirer 275 acquires the information is not limited to the nonvolatile memory 220 or the position detection unit 400A and may, for example, be the operation section 260 or an external apparatus coupled via a wire or wirelessly to the projection unit 200A.

The installation information 221A contains information necessary for the image generator 276 to generate the calibration image information 222 as appropriate as well as the information described above. The installation information 221A is information on the installation state of the display apparatus 100A. The information can be broadly classified into information on the configuration or specifications of the projection unit 200A, information on the configuration or specifications of the position detection unit 400A, and information on the relative positions of the projection unit 200A and the position detection unit 400A.

Examples of the information on the configuration or specifications of the projection unit 200A may include information on the zooming magnification of the projection system 213 and information on the aspect ratio of the liquid crystal panel used as the light modulator 212. Examples of the information on the configuration or specifications of the position detection unit 400A may include a variety of pieces of information contained in the position information 422, which will be described later. Examples of the information on the relative positions of the projection unit 200A and the position detection unit 400A may include information representing the relative positional relationship between the imaging system 411 and the projection system 213, information on the distance between the point where an optical axis AX1 intersects the screen SC and a camera lens center position, the relative positional relationship among the imaging device 413, the imaging system 411, and the projection system 213, the relative positional relationship between the screen SC and the imaging section 410, the relative positional relationship between the screen SC and an optical axis AX2 of the imaging system 411, and the relative positional relationship among the screen SC, the projection system 213, and the imaging section 410.

The image generator 276 uses the installation information 221A and the pattern generation information 223 stored in the nonvolatile memory 220 to generate the calibration image information 222. The image generator 276 then causes the nonvolatile memory 220 to store the calibration image information 222. The pattern generation information 223 contains information on rules of the shape, arrangement, and other factors of the marks contained in the calibration image GC.

The position detection unit 400A has the same hardware configuration as that of the position detection unit 400 in the first embodiment. It is, however, noted that the nonvolatile memory 420 stores the position information 422 as well as the same parameters 412 as those in the first embodiment.

The position information 422 is information on the configuration or specifications of the position detection unit 400A. For example, the position information 422 contains information on the imaging system 411 of the imaging section 410. Specifically, the position information 422 contains information on the amount of deviation of the intersection of the optical axis of the imaging system 411 and the imaging surface of the imaging device 413 from a reference position that is a position specified in advance, such as the center of the imaging surface of the imaging device 413. The position information 422 further contains, as the information on the specifications of the imaging section 410, information on the optical characteristics of the imaging system 411, information on the number of pixels and other factors of the imaging device 413, and other pieces of information. The position information 422 may further contain information on the relative positional relationship between the imaging system. 411 and the projection system 213. The position information 422 may further contain information on the relative positional relationship among the imaging device 413, the imaging system 411, and the projection system 213. The information on the relative positional relationships contained in the position information 422 can be expressed, for example, by using a three-dimensional coordinate system imaginarily set in the space where the display apparatus 100A is installed.

The thus configured display apparatus 100A uses the installation information 221A to generate the calibration image GC. Since the installation information 221A contains the measurement information 221, the calibration image GC corresponding to the installation state of the display apparatus 100A can be used to perform the calibration. As a result, the same effects as those provided by the first embodiment described above can be provided. Further, since the installation information 221A contains not only the measurement information 221 but other pieces of information on the installation state of the display apparatus 100A, the marks in the calibration image GC captured by the imaging section 410 during the calibration are allowed to have a preferable shape, as will be described later. As a result, the accuracy or success rate of the process of detecting the marks in the calibration image from a captured image can be expected to improve. The calibration performed by the display apparatus 100A will be described below.

2-2. Action of Display Apparatus
2-2a. Procedure of Calibration

Figure 12:
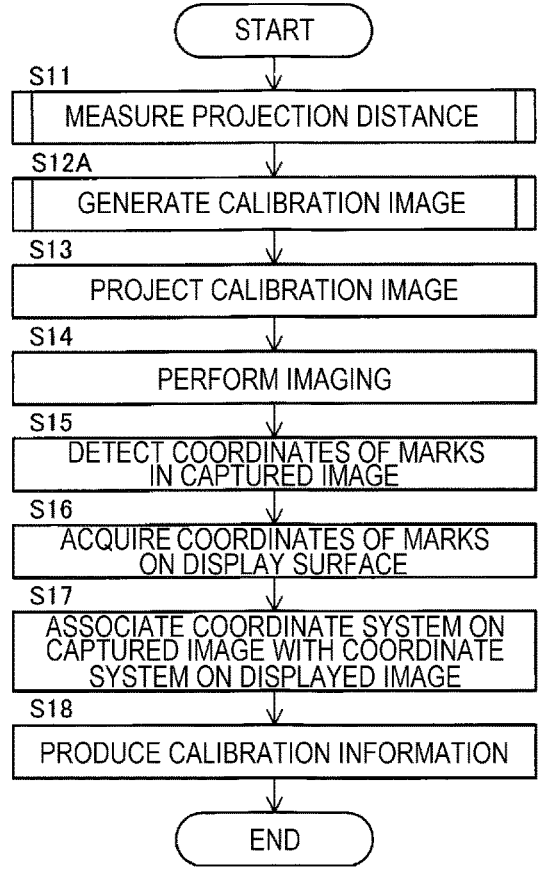
FIG. 12 is a flowchart showing the calibration process carried out by the display apparatus according to the second embodiment.

FIG. 12 is a flowchart showing the calibration process carried out by the display apparatus 100A according to the second embodiment. When the processor 270 receives the calibration start instruction, the display apparatus 100A carries out step S11, as in the first embodiment. Thereafter, in step S12A, the image generator 276 generates the calibration image. Information on the calibration image is stored as the calibration image information 222 in the nonvolatile memory 220. The process in step S12A will be described later in detail.

After the calibration image is generated, the processor 270 carries out steps S13 to S18, as in the first embodiment.

2-2b. Overview of Generation of Calibration Image

Figure 13:
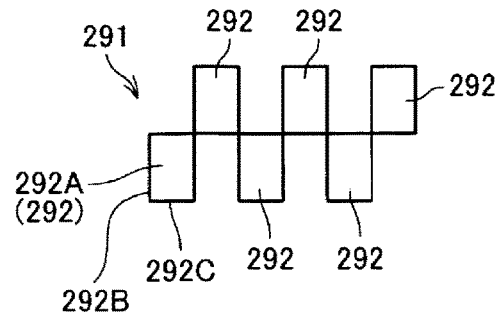
FIG. 13 shows a preferable shape of marks in the captured image.

FIG. 13 shows a preferable shape of each mark 291 in the captured image GI captured by the imaging section 410. The mark 291 is formed of a combination of a plurality of rectangles 292. The outer edge of the mark 291 is formed of a plurality of line segments perpendicular to each other. According to the configuration, the positions of the pixels of the captured image GI that correspond to the intersections of the plurality of line segments are readily identified as compared with a case where the plurality of line segments obliquely intersect each other. As a result, the mark detector 463 can detect the position of the mark with increased accuracy. The image generator 276 therefore generates the calibration image GC that allows the imaging section 410 to provide the mark 291 shown in FIG. 13.

Figure 14:
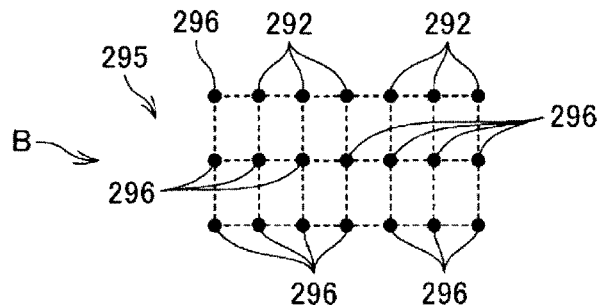
FIG. 14 shows a model figure that is a model of the mark shown in FIG. 13.

FIG. 14 shows a model figure 295, which is a model of the mark 291 shown in FIG. 13. The image generator 276 processes the model figure 295 shown in FIG. 14 to identify the shapes and positions of the plurality of rectangles 292, which form the mark 291. The model figure 295 is a set of a plurality of reference points 296 corresponding to the vertices of the rectangles 292. The mark 291 can be reproduced by connecting the plurality of reference points 296 with straight lines.

Figure 15:
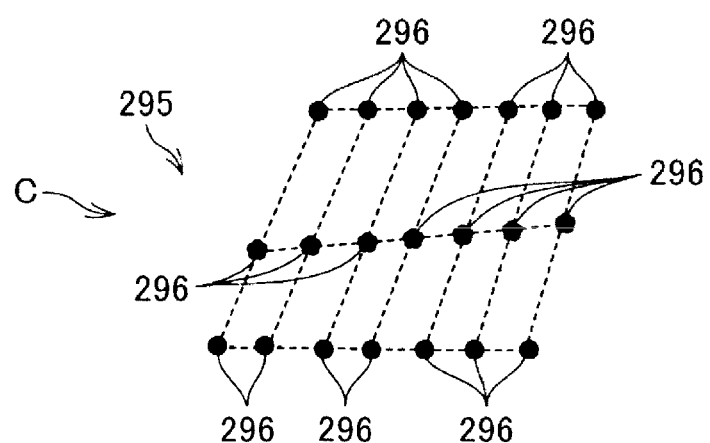
FIG. 15 shows that the model figure shown in FIG. 14 is converted into a model figure expressed in the coordinate system set in the display section.

FIG. 15 shows that the model figure 295 shown in FIG. 14 is converted into a figure in the coordinate system set on the screen SC or in the display section 210. The image generator 276 converts the reference points 296 of the model FIG. 295 expressed by the coordinates of the coordinate system on which the captured image GI is based into the reference points expressed by the coordinates set on the screen SC or in the display section 210, as shown in FIG. 15.

Figure 16:
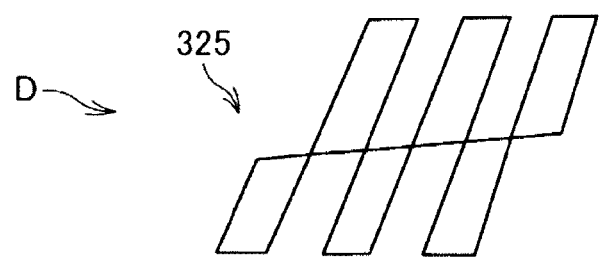
FIG. 16 shows a mark based on the model figure shown in FIG. 15.

FIG. 16 shows a mark 325 based on the model figure 295 shown in FIG. 15. The image generator 276 generates the mark 325 placed in the calibration image by connecting the converted reference points 296 shown in FIG. 15 with straight lines as shown in FIG. 16. The image generator 276 then generates the calibration image GC by arranging a plurality of marks 325 in a matrix and superimposing the arranged marks on the rectangular background.

2-2c. Procedure of Generation of Calibration Image

Figure 17:
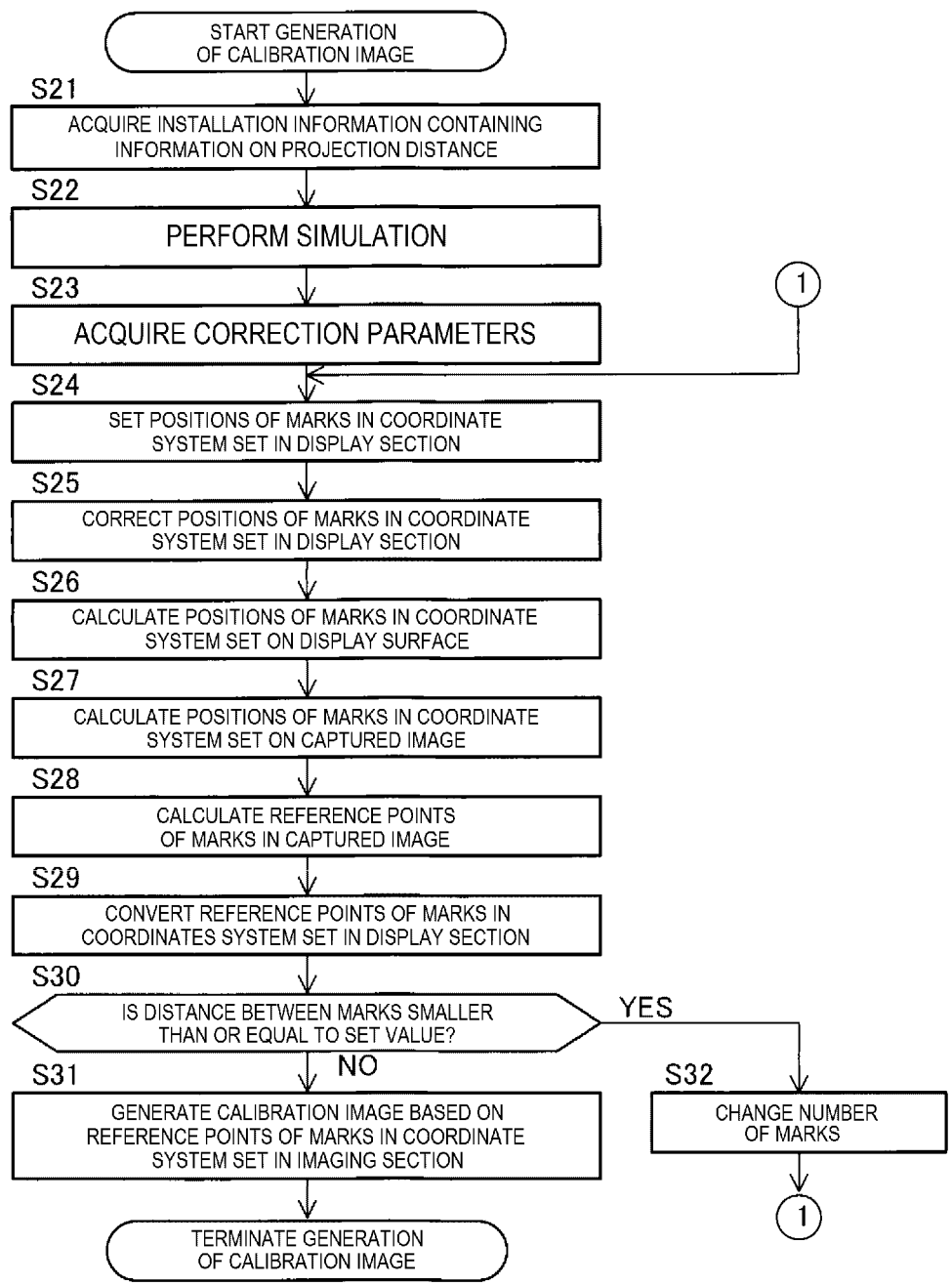
FIG. 17 is a flowchart showing a calibration image generation process carried out by the display apparatus.

A calibration image generation process, which is the process in step S12A shown in FIG. 12 described above, will be described below. FIG. 17 is a flowchart showing the calibration image generation process carried out by the display apparatus 100A.

In the present process, the information acquirer 275 first acquires information on the installation state of the display apparatus 100A in step S21. The information is stored as the installation information 221A in the nonvolatile memory 220. The information contains information on the distance L measured by the measurement section 272 described above.

In step S22, the image generator 276 subsequently performs simulation based on the installation information 221A. In the simulation, the relative positions of coordinates in the coordinate systems set in the projection system 213, the imaging system 411, and the screen SC are reproduced in a three-dimensional imaginary simulation space.

Figure 18:
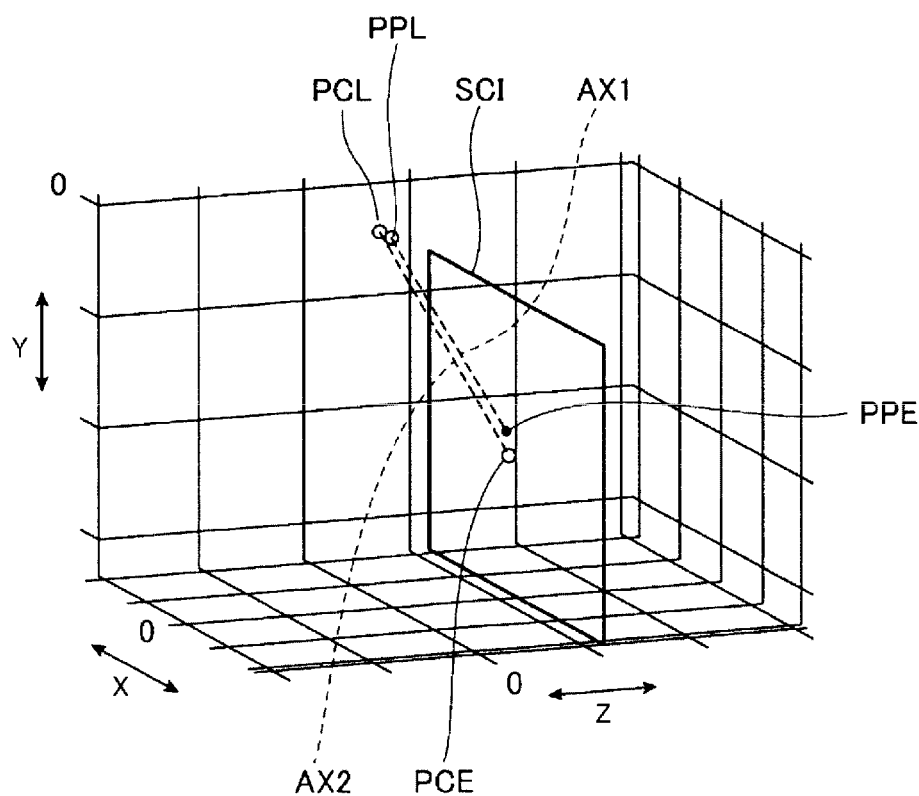
FIG. 18 diagrammatically shows simulation in the calibration image generation process.

FIG. 18 diagrammatically shows the simulation in the calibration image generation process. In the simulation in step S22, a point PPL showing the position of the projection system 213, a point PCL showing the position of the imaging system 411, and a plane SCI showing an imaginary position of the screen SC are placed in the imaginary three-dimensional space, as shown, for example, in FIG. 18. An XYZ orthogonal coordinate system is set in the three-dimensional space, and the positions of the points PPL and PCL and the plane SCI are each expressed in the form of coordinates X, Y, and Z.

In step S22, the image generator 276 calculates the coordinates X, Y, and Z of the points PPL and PCL and the plane SCI based on the installation information 221A. Further, in step S22, the image generator 276 also calculates the coordinates X, Y, and Z of an intersection PPE of the optical axis AX1 of the projection system 213 and the plane SCI and the coordinates X, Y, and Z of an intersection PCE of the optical axis AX2 of the imaging system 411 and the plane SCI. It can also be said that the intersection PCE is a camera lens center. In the present simulation, the intersection PCE is used to carry out the process of associating the shape and coordinates of the projection image G with those of the captured image GI.

The image generator 276 uses the relative positions of the points and the surface in the three-dimensional space described above to determine the relative relationship among a position in the coordinate system set in the display section 210, a position in the coordinate system set on the screen SC, and a position in the coordinate system set in the imaging section 410.

Referring back to FIG. 17, in step S23, the information acquirer 275 acquires parameters for the geometric correction performed by the correction processor 274.

In step S24, the image generator 276 calculates the positions of the marks in the coordinate system set in the display section 210. Subsequently, in step S25, the image generator 276 calculates the positions of the marks after the geometric correction based on the parameters acquired in step S23 and the positions calculated in step S24.

Figure 19:
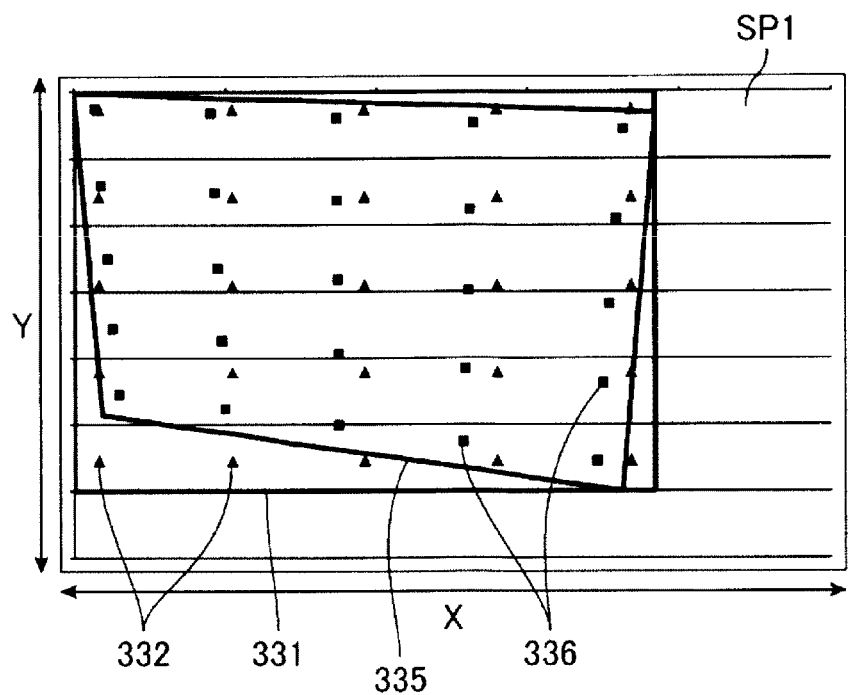
FIG. 19 diagrammatically shows calculation of the positions of marks in a panel coordinate system in the calibration image generation process.

FIG. 19 diagrammatically shows the calculation of the positions of the marks in a panel coordinate system SP1 in the processes in steps S24 and S25. The panel coordinate system SP1 is the coordinate system set in the display section 210 in correspondence with the display area of the light modulator 212.

In step S24, the image generator 276 calculates the positions 332 of the marks contained in an image 331 placed in the panel coordinate system SP1 and corresponding to the calibration image before the geometric correction, as shown in FIG. 19. The image 331 has a rectangular shape. The size and position of the image 331 in the panel coordinate system SP1 are determined based on the display resolution of the light modulator 212. In the typical example shown in FIG. 19, the image 331 contains 25 marks arranged in a matrix having five rows and five columns.

In step S25, the image generator 276 calculates positions 336 of the marks contained in an image 335 placed in the panel coordinate system SP1 and corresponding to the calibration image after the geometric correction. The image 331 before the geometric correction is deformed by the geometric correction into the image 335. The deformation causes positions 332 of the marks contained in the image 331 before the geometric correction to move to the positions 336 after the geometric correction.

Referring back to FIG. 17, in step S26, the image generator 276 calculates the positions of the marks in the coordinate system set on the screen SC.

Figure 20:
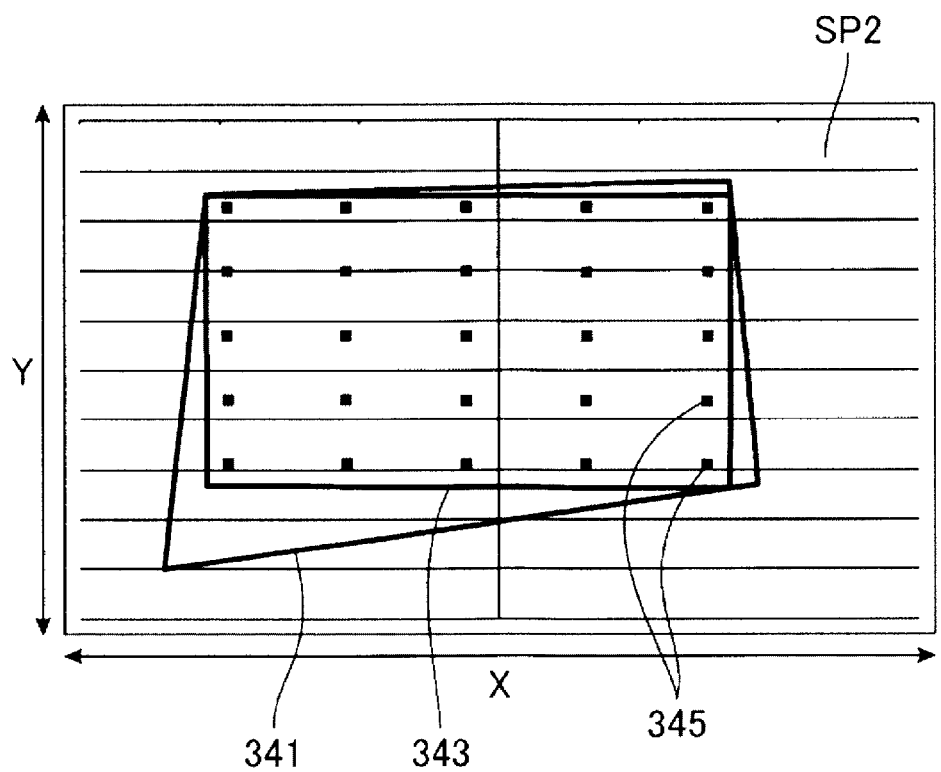
FIG. 20 diagrammatically shows calculation of the positions of the marks on a screen in the calibration image generation process.

FIG. 20 diagrammatically shows the calculation of the positions of the marks in a screen coordinate system SP2 in the process in step S26. The screen coordinate system SP2 is the coordinate system set on the screen SC in correspondence with the image projection area DA of the screen SC.

A projection image 341 corresponding to the image 331 before the geometric correction has trapezoidal distortion in the screen coordinate system SP2. In contrast, a projection image 343 corresponding to the image 335 after the geometric correction has a rectangular shape in the screen coordinate system SP2. Further, in the screen coordinate system SP2, positions 345 of the plurality of marks contained in the projection image 343 are uniformly arranged.

Referring back to FIG. 17, in step S27, the image generator 276 uses information on the correspondence between the screen SC and the captured image to calculate the positions of the marks in the captured image. Further, in step S28, the image generator 276 places reference points of the rectangles that form the marks in the positions of the marks calculated in step S27 in such a way that the reference points coincide with the mark positions and determines the positions of the reference points (step s28).

Figure 21:
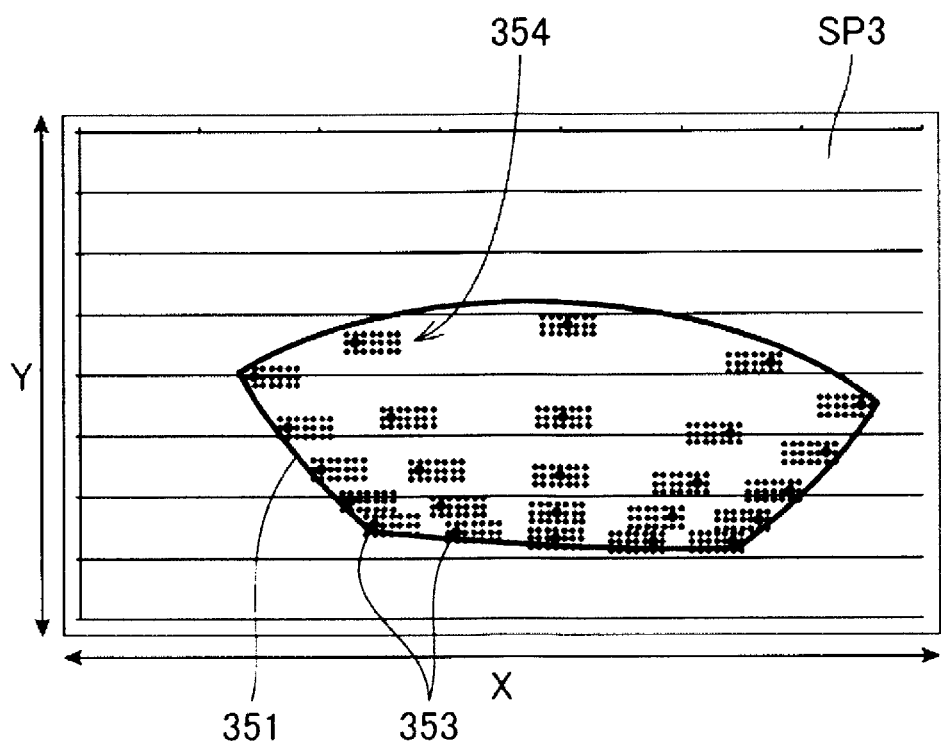
FIG. 21 diagrammatically shows calculation of the positions of the marks in an imaging coordinate system in the calibration image generation process.

FIG. 21 diagrammatically shows calculation of the positions of the marks in an imaging coordinate system SP3. The imaging coordinate system SP3 is the coordinate system set in the captured image in correspondence with the captured image.

In the imaging coordinate system SP3, a captured image 351 corresponding to the projection image 343 has a shape distorted under the influence of the positional relationship between the imaging section 410 and the screen SC and refraction that occurs in the imaging system 411. In step S27, the image generator 276 calculates positions 353 of the marks in the imaging coordinate system SP3 in consideration of the influence. Thereafter in step S28, the image generator 276 determines the positions of reference point groups 354 in such a way that the reference point groups 354 coincide with the positions 353 corresponding to the 25 marks. The reference point groups 354 are each a set of reference points that are the vertices of the rectangles that form the marks, as in the case of the set of the plurality of reference points 296 shown in FIG. 14 described above. One reference point group 354 corresponds to one mark. The image generator 276 determines the positions of the reference point groups 354 in such a way that the marks in the captured image each have a preferable shape. The plurality of reference points that form each of the reference point groups 354 shown in FIG. 21 are arranged in a matrix in an axis-X direction and an axis-Y direction. Therefore, in the captured image, the marks derived from the reference point groups 354 are each a rectangle having edges parallel to the axis-X and axis-Y directions.

Referring back to FIG. 17, in step S29, the image generator 276 converts the positions of the reference points of the marks in the captured image into the positions of the reference points of the marks in the light modulator 212.

Figure 22:
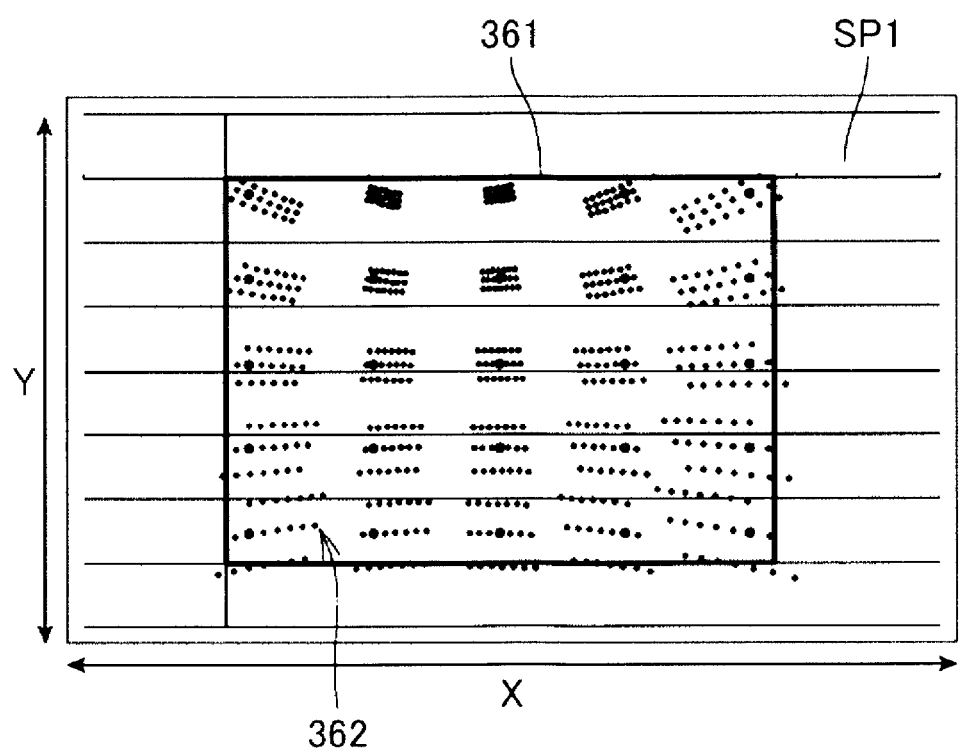
FIG. 22 diagrammatically shows conversion of the positions of reference points of the marks in the imaging coordinate system into the positions of the reference points of the marks in the panel coordinates system in the calibration image generation process.

FIG. 22 diagrammatically shows the conversion of the positions of the reference points of the marks in the imaging coordinate system SP3 into the positions of the reference points of the marks in the panel coordinates system SP1 in the process in step S29. A position in the imaging coordinate system SP3 can be associated with a position in the panel coordinates system SP1 based on the result of the simulation shown in FIG. 7 described above. The image generator 276 therefore converts the positions of the reference points of the reference point groups 354 in the imaging coordinate system SP3 that are calculated in step S28 into the positions in the panel coordinates system SP1. As a result, reference point groups 362 are placed in the panel coordinates system SP1. The conversion described above converts the captured image 351 in the imaging coordinate system SP3 into a rectangular image 361 in the panel coordinates system SP1.

Referring back to FIG. 17, in step S30, the image generator 276 evaluates whether or not the interval between the marks is smaller than or equal to a set value based on the positions of the reference point groups determined in step S29.

In a case where the interval between the marks is greater than the set value in step S30, the image generator 276 generates the calibration image in step S31 based on the reference points determined in step S29. The image generator 276 causes the nonvolatile memory 220 to store the calibration image information 222 on the calibration image and terminates the calibration image generation process.

In step S31, the image generator 276 links the reference points determined in step S29 to each other with straight lines to generate the marks in the calibration image. The thus generated marks allow the accuracy of the detection performed by the mark detector 463. The accuracy or success rate of the calibration can thus be increased.

On the other hand, when the interval between the marks is smaller than or equal to the set value in step S30, the image generator 276 changes the number of marks in the calibration image in step S32 and transitions to step S24 described above. In the case where the interval between the marks is smaller than or equal to the set value in step S30, the distance between the reference points of adjacent marks is small, or the marks overlap with each other. In this case, the mark detector 463 is highly likely to be incapable of distinguishing the plurality of marks in the calibration image from one another. To avoid the problem, the image generator 276 reduces the number of marks in the calibration image in step S32. The reduced number of marks is then, for example, 16 in a matrix having four rows and four columns, which is smaller than 25 in the matrix having five rows and five columns, which is the number of marks presented by way of example in the description of steps S24 to S29 described above.

In the present embodiment, the process of reducing the number of marks is carried out in step S32. In place of the process, the process of reducing the size of each of the marks may be carried out. In this case, a necessary distance between the marks can be ensured with no reduction in the number of marks.

The display apparatus 100A described above includes the image generator 276, which generates the calibration image information 222, which is image information on the calibration image, based on the distance L measured by the measurement section 272, as described above. The calibration processor 273 then causes the display section 210 to display the calibration image based on the calibration image information 222. The calibration can therefore be performed by using an appropriate calibration image for each distance L. Also in the present embodiment, variation in the brightness of the calibration image displayed on the screen SC due to a change in the distance L can be reduced.

3. Variations

The display apparatuses and the display systems according to the embodiments of the present disclosure have been described with reference to the drawings, but the present disclosure is not limited to the embodiments. The configuration of each portion in the embodiments of the present disclosure can be replaced with an arbitrary configuration providing the same function as that in the embodiments described above. Further, in the present disclosure, arbitrary configurations in the embodiments described above may be combined with each other.

3-1. Variation 1

The method for adjusting the brightness of the calibration image displayed on the screen SC by using the distance L measured by the measurement section 272 is not limited to the method in the embodiments described above. For example, the calibration processor 273 may adjust the imaging sensitivity of the imaging section 410 based on the distance L. In this case, the calibration processor 273 makes the adjustment in such a way that the imaging sensitivity of the imaging section 410 lowers as the distance L measured by the measurement section 272 decreases. The adjustment allows reduction in the decrease in the accuracy of the detection of the marks in the calibration image due to saturation of the sensitivity of the pixels of the imaging device 413 provided in the imaging section 410. The aspect described above may be combined with any of the embodiments described above.

3-2. Variation 2

The calibration processor 273 adjusts the period for which the imaging section 410 is exposed to light based on the distance L measured by the measurement section 272. The calibration processor 273 makes the adjustment in such a way that the period for which the imaging section 410 is exposed to light shortens as the distance L measured by the measurement section 272 decreases. The adjustment also allows reduction in the decrease in the accuracy of the detection of the marks in the calibration image due to saturation of the sensitivity of the pixels of the imaging device 413 provided in the imaging section 410. The aspect described above may be combined with any of the embodiments described above or Variation 1.

3-3. Variation 3

The above embodiments have been described with reference to the case where the display section 210 and the imaging section 410 are used to measure the distance L. Instead, an optical or otherwise configured distance meter provided separately from the display section 210 and the imaging section 410 may be used to measure the distance L.

What is claimed is:

1. A display apparatus comprising:
   a display section that projects and displays an image on a display surface;
   an imaging section that captures an image of the display surface to obtain a captured image;
   a measurement section that measures a distance between the display surface and the display section; and
   a calibration processor that
      causes the display section to display a calibration image containing a position detection mark based on the distance, causes the imaging section to capture an image of the calibration image displayed on the display surface to obtain a captured calibration image, detects a position of the position detection mark in the captured calibration image, and performs calibration that associates a coordinate system set on the display section with a coordinate system on which the captured image is based, based on the position; and an image generator that generates image information on the calibration image based on the distance measured by the measurement section, wherein the calibration processor causes the display section to display the calibration image based on the image information.

2. The display apparatus according to claim 1,
wherein the display section includes a light source used to project the image, and
the calibration processor lowers luminance of light from the light source as the distance measured by the measurement section decreases.

3. The display apparatus according to claim 1,
wherein the calibration processor adjusts imaging sensitivity of the imaging section based on the distance measured by the measurement section.

4. The display apparatus according to claim 1,
wherein the calibration processor adjusts a period for which the imaging section is exposed to light based on the distance measured by the measurement section.

5. The display apparatus according to claim 1,
wherein the measurement section
causes the display section to display a measurement image containing a measurement mark,
causes the imaging section to capture an image of the measurement image displayed on the display surface to obtain a captured measurement image, and
measures the distance between the display surface and the display section based on the captured measurement image.

6. A display system comprising:
the display apparatus according to claim 1; and
a pointing element that points at a position on the display surface.

7. A method for controlling a display apparatus including a display section that projects and displays an image on a display surface and an imaging section that captures an image of the display surface to obtain a captured image, the method comprising:
measuring a distance between the display surface and the display section;
generating image information on a calibration image based on the measured distance, the calibration image containing a position detection mark;
projecting the calibration image on the display surface based on the image information;
capturing an image of the calibration image projected on the display surface to obtain a captured calibration image;
detecting a position of the position detection mark in the captured calibration image; and
performing calibration that associates a coordinate system set on the display section with a coordinate system on which the captured image is based, based on the position.

8. The display apparatus according to claim 1,
wherein the image generator performs geometric correction on a calibration image before geometric correction to generate the image information.

9. A display apparatus comprising:
a display section that projects and displays an image on a display surface;
an imaging section that captures an image of the display surface to obtain a captured image;
a measurement section that measures a distance between the display surface and the display section; and
a calibration processor that
causes the display section to display a calibration image containing a position detection mark based on the distance,
causes the imaging section to capture an image of the calibration image displayed on the display surface to obtain a captured calibration image,
detects a position of the position detection mark in the captured calibration image, and
performs calibration that associates a coordinate system set on the display section with a coordinate system on which the captured image is based, based on the position,
wherein the measurement section
causes the display section to display a measurement image containing a measurement mark,
causes the imaging section to capture an image of the measurement image displayed on the display surface to obtain a captured measurement image, and
measures the distance between the display surface and the display section based on the captured measurement image.

* * * * *